United States Patent [19]

Kitano

[11] Patent Number: 4,681,809

[45] Date of Patent: Jul. 21, 1987

[54] SHAPED BODIES OF CALCIUM SILICATE

[76] Inventor: Tatsuo Kitano, 7-9, Asahiku, Edomekami, Harue-cho, Sakai-gun, Fukui-ken, Japan

[21] Appl. No.: 768,086

[22] Filed: Aug. 21, 1985

[30] Foreign Application Priority Data

Aug. 27, 1984 [JP] Japan ................................. 59-177976

[51] Int. Cl.[4] ............................................. B32B 17/06
[52] U.S. Cl. ....................................... 428/428; 264/56; 264/60; 428/432; 428/446; 428/689; 428/704; 501/32; 501/123; 501/133; 501/154
[58] Field of Search ............... 428/428, 432, 446, 454, 428/689, 704; 501/6, 7, 32, 102, 123, 133, 154; 264/60, 56

[56] References Cited

U.S. PATENT DOCUMENTS 3,928,054 12/1975 Kubo .................................... 501/123
3,941,604 3/1976 Boyce .................................. 501/144

*Primary Examiner*—George F. Lesmes
*Assistant Examiner*—P. R. Schwartz
*Attorney, Agent, or Firm*—Armstrong, Nikaido, Marmelstein & Kubovcik

[57] ABSTRACT

This invention provides a shaped body of calcium silicate of which the whole or the surface layer comprises a mixture of calcium silicate crystal and at least one inorganic compound selected from the group consisting of spodumene, petalite, eucryptite, lithium orthoclase, quartz glass, Vycor glass, cordierite, beryl, aluminum titanate and zirconium phosphate and a process for preparing the same.

11 Claims, No Drawings

SHAPED BODIES OF CALCIUM SILICATE

This invention relates to novel shaped bodies of calcium silicate and more particularly to shaped bodies of calcium silicate having improved properties.

Since shaped bodies of calcium silicate are outstanding in lightweight properties, heat insulation and fire resistance and have numerous other good properties, they are widely used in various fields.

However, shaped bodies of calcium silicate have the drawbacks of being inherently poor in resistance to thermal shock and acid resistance. With these defects, conventional shaped bodies of calcium silicate involve difficulties in use as materials which are repeatedly subjected to rapid heating or rapid cooling or brought into contact with an acid atmosphere.

No method has been developed for giving improved thermal shock resistance to calcium silicate shaped bodies.

Conventional methods for imparting an acid resistance to shaped bodies of calcium silicate include those in which sulfur oxide and/or oxyacid is acted on a calcium silicate shaped body to partly or wholly convert the calcium silicate constituting the shaped body into II-$CaSO_4$ and amorphous silica (Japanese Examined Patent Publication No. 34852/1976) and those which attempt to improve the acid resistance by inclusion of acid resistant $SiO_2$ in the surface layer of the shaped body (Japanese Examined Patent Publication No. 15117/1984). These conventional methods give calcium silicate shaped bodies with resistance to thermal shock not improved to any extent, although with enhanced acid resistance.

It is an object of this invention to provide shaped bodies of calcium silicate improved in both resistance to thermal shock and acid resistance.

It is another object of the invention to provide shaped bodies of calcium silicate not only having improved resistance to thermal shock and enhanced acid resistance but also maintaining the mechanical strength at a level sufficiently suitable for practical use.

It is a further object of the invention to provide a process for preparing the foregoing shaped bodies of calcium silicate.

These and other objects of the invention will become more apparent from the following description.

This invention provides shaped bodies of calcium silicate of which the whole or the surface layer comprises a mixture of calcium silicate crystal and at least one inorganic compound selected from the consisting of spodumene, petalite, eucryptite, lithium orthoclase, quartz glass, Vycor glass, cordierite, beryl, aluminum titanate and zirconium phosphate.

We conducted extensive research and found the followings:

(1) when incorporating at least one of specific inorganic compounds into the whole or the surface layer of a calcium silicate shaped body, a novel calcium silicate shaped body can be prepared which are significantly improved in both thermal shock resistance and acid resistance;

(2) although containing at least one of the inorganic compounds, the foregoing calcium silicate shaped body maintains the mechanical strength at a level sufficiently suitable for practical use; and (3) despite the inorganic compound present therein, the foregoing calcium silicate shaped body retains inherent properties of calcium silicate shaped bodies, such as lightweight properties, high heat insulating ability, high fire resistance and the like.

With these properties, the shaped body of this invention is useful as materials which are repeatedly subjected to rapid heating or rapid cooling or brought into contact with an acid atmosphere. The shaped bodies of the invention are therefore usable not only as heat insulating material but also singnificantly suitable as lining materials for ducts for high-temperature exhaust gases and/or acidic exhaust gases.

Examples of calcium silicate crystals which constitute the shaped body of this invention include tobermorite crystal, xonotlite crystal, wollastonite crystal, etc. According to this invention, the whole of the calcium silicate shaped body may comprise a mixture of calcium silicate crystal and at least one of the above-specified inorganic compounds, or the surface layer of the calcium silicate shaped body may comprise such mixture. The latter shaped bodies include those having at least one surface of the shaped body composed of said mixture to those having the entire surface thereof formed of said mixture. Such shaped body may be used with the surface of the mixture exposed to acid and/or heat. A preferred calcium shaped body consists of two layers, i.e. a layer of said mixture and a layer of calcium silicate crystal. The thickness of the surface layer of the mixture is at least about 2 mm, preferably at least about 5 mm.

It is critical in this invention that the whole or the surface layer of calcium silicate shaped bodies contain at least one inorganic compound selected from the group consisting of spodumene, petalite, eucryptite, lithium orthoclase, quartz glass, Vycor glass, cordierite, beryl, aluminum titanate and zirconium phosphate which serve to give shaped bodies pronouncedly improved thermal shock resistance and acid resistance. Preferred examples of the inorganic compounds are spodumene, petalite, quartz glass, Vycor glass, cordierite, beryl, aluminum titanate and zirconium phosphate.

The above-mentioned inorganic compounds are used singly or at least two of them are usable in admixture. The particle size of the inorganic compounds to be used in this invention are not particularly limited but ranges from about 0.1 to about 1000 $\mu$m, preferably from about 1 to about 300 $\mu$m. Said inorganic compounds may contain impurities insofar as the amount of the impurities is in such range that the impurities do not adversely affect the properties of the shaped body.

The amount of the inorganic compounds used in this invention is suitably determined over a wide range. A suitable ratio by weight of the inorganic compound to the calcium silicate crystal is about 1:9 to about 4:1, preferably about 1:4 to about 7:3, more preferably about 4:6 to about 6:4. If the inorganic compound is present in a smaller amount than in the ratio of 1:9, the shaped body is not imparted satisfactorily improved thermal shock resistance or acid resistance. The presence of the inorganic compound in a greater proportion than in 4:1 results in shaped bodies having lower bending strength, hence undesirable.

This invention provides a process for preparing shaped bodies of calcium silicate containing at least one specific inorganic compound.

The shaped bodies of this invention can be prepared by various processes. The shaped bodies of this invention can be prepared for example by producing an aqueous slurry of calcium silicate crystal, adding to the slurry at least one of the above-specified inorganic compounds and when required, a reinforcing material or the like, shaping the mixture and drying the product.

The process for preparing the aqueous slurry of calcium silicate crystal is known in the art. For example, preferred processes are disclosed in Japanese Examined Patent Publications Nos. 4968/1979 and 12526/1978.

An aqueous slurry of calcium silicate crystal can be prepared according to the processes described in the aforesaid publications, i.e. by mixing together a siliceous material and lime in water to prepare a starting slurry and subjecting the slurry to hydrothermal reaction while agitating the slurry with heating under increased pressure to produce calcium silicate crystal such as tobermorite, xonotlite, etc. The calcium silicate crystal thus obtained is three-dimensionally interlocked with one another to form substantially globular secondary particles. A shaped product of adequate mechanical strength can be obtained by shaping the slurry having such crystal dispersed in water and drying the resulting product.

Any of suitable siliceous and lime materials commonly used in the art can be employed with good results for preparation of the calcium silicate crystal to be used in this invention. Examples of useful siliceous materials are siliceous stone, siliceous sand, silica flour, silica gel, white carbon, diatomaceous earth, etc. Examples of useful lime materials are quick lime, slaked lime, carbide residuum, etc. Preferred amount of water used for preparing the slurry is about 5 to about 20 times the weight of the solids. The CaO to $SiO_2$ mole ratio is about 0.70 to about 0.90 in synthesis of tobermorite crystal and about 0.90 to about 1.15 in synthesis of xonotlite crystal.

The slurry thus prepared is subjected to hydrothermal reaction with stirring. The reaction is conducted under saturated steam pressure of at least about 4 $kg/cm^2$, preferably about 6 to about 30 $kg/cm^2$. The reaction gives a slurry having globular secondary particles each made up of tobermorite crystal and/or xonotlite crystal and dispersed in water. When preparing a wollastonite crystal slurry, the xonotlite crystal slurry is dried and baked at a temperature of about 800° to about 1000° C. and water is added to make a slurry.

At least one of the above-specified inorganic compounds and when required, a reinforcing material or like additive are uniformly mixed with the slurry thus obtained, the mixture is shaped and the product is dried, in the conventional manner, thereby giving a shaped body of calcium silicate crystal according to this invention. When the calcium silicate crystal in the shaped body thus obtained is xonotlite, a wollastonite shaped body according to this invention can be prepared also by baking the xonotlite shaped body to a temperature of about 800° to about 1000° C.

Reinforcing materials and like additives useful in this invention can be any of those heretofore used in preparing these kinds of calcium silicate shaped bodies such as asbestos, rock wools, glass fibers, ceramic fibers, organic fibers, clays, cements, etc. The amount of the additive used is about 5 to about 30% by weight based on the shaped body.

The shaped body of this invention can be prepared by shaping an aqueous slurry containing a mixture of calcium silicate crystal and at least one of the above-specified inorganic compounds and drying the shaped product. The shaped body wholly comprising said mixture is prepared from a slurry of the mixture alone, whereas the shaped body with the mixture in the surface layer of the body is prepared respectively from a slurry of calcium silicate crystal and a slurry of the mixture. The shaped body consisting of two layers of calcium silicate crystal and the mixture can be prepared for example by the following process. A slurry-A is produced by homogeneously mixing together calcium silicate crystal, one of the foregoing inorganic compounds, water and when required a reinforcing material or like additive. A slurry-B is prepared which comprises calcium silicate crystal, water and when required the aforesaid additive. The slurry-B is poured into a mold and press-shaped. And then the slurry-A is placed into the mold over the layer made of the slurry-B and is press-shaped, followed by drying the shaped product. The slurries-A and-B may be placed into the mold in reverse order. Also the two-layer shaped product can be made by joining together a shaped body prepared from the slurry-A and a shaped body prepared from the slurry-B with a heat resistant adhesive. Useful heat resistant adhesives can be any of those heretofore used in the art such as those of the sodium silicate, potassium silicate, or aluminum phosphate type.

This invention will be described below in more detail with reference to the following examples in which the parts and percents are all by weight and in which the properties of the shaped bodies were measured by the methods given below.

(i) Bending strength: Measured according to JIS A 9510.

(ii) Resistance to thermal shock: One side of a plate-like shaped body measuring $1000 \times 1000 \times 50$ mm was rapidly heated (20° C./min) to a specific temperature in an electric furnace, maintained at the same temperature for 1 hour and cooled in air. This procedure was repeated 4 times and the shaped body was checked for the change in appearance.

(iii) Acid resistance: One side of a plate-like shaped body measuring $1000 \times 1000 \times 50$ mm is coated with 300 $g/m^2$ of 20% solution of $H_2SO_4$ and the coated body was rapidly heated (20° C./min) to a specific temperature in an electric furnace. The shaped body thus heated was maintained at the same temperature for 1 hour and cooled in air whereupon the body was checked for the change in appearance.

EXAMPLE 1

Quick lime (48 parts, CaO 95%) was hydrated with water at 80° C. to obtain milk of lime. To the milk of lime thus obtained was added 52 parts of finely divided siliceous stone ($SiO_2$ 94%). To the mixture was added water in such amount that the whole amount of water was 12 times the weight of solids, whereby a starting slurry was prepared. The slurry was subjected to hydrothermal reaction at a temperature of 191° C. and at saturated steam pressure of 12 $kg/cm^2$ for 5 hours in an autoclave with its agitator blades driven at 30 r.p.m.

The resulting slurry was dried at 100° C. for 24 hours and analyzed by X-ray diffractometer. The analysis of X-ray diffraction revealed the peak of the xonotlite crystal.

When the slurry was dried on a slide glass and observed under an optical microscope, globular secondary particles were identified which had an outside diameter of 5 to 150 μm.

To the slurry were added 7 parts of amosite, 3 parts of portland cement and petalite powder (up to 74 μm in particle size, containing 8.5% of quartz) in the amount specified below in Table 1. The mixture was press-shaped and the shaped product was dried at 100° C., giving a plate-like shaped body measuring 1000×1000×50 mm.

Six specimens were prepared in this way using petalite in a petalite to calcium silicate crystal ratio by weight as shown below in Table 1 and were tested for the density, bending strength, resistance to therma shock and acid resistance with the results as indicated below in Tables 1 and 2.

TABLE 1

| Specimen No. | Petalite/calcium silicate crystal ratio (by weight) | Properties of shaped body | |
|---|---|---|---|
| | | Density (g/cm$^3$) | Bending strength (kg/cm$^2$) |
| 1 | 0/10 | 0.39 | 36 |
| 2 | 2/8 | 0.40 | 29 |
| 3 | 4/6 | 0.38 | 21 |
| 4 | 5/5 | 0.41 | 17 |
| 5 | 6/4 | 0.39 | 14 |
| 6 | 7/3 | 0.39 | 10 |

TABLE 2

| | Properties of shaped body | | |
|---|---|---|---|
| Specimen No. | Resistance to thermal shock (temp. 500° C.) | Resistance to thermal shock (temp. 700° C.) | Acid resistance (temp. 700° C.) |
| 1 | 1st thermal shock produced cracks and 4th thermal shock enlarged the cracks. | 1st thermal shock formed cracks deep into the side portion. | Scale-like cracks developed all over the surface. |
| 2 | No crack was formed even on exposure to 4th thermal shock. | 1st and 2nd thermal shocks created no crack. | Scale-like cracks locally appeared. |
| 3 | No crack was formed even on exposure to a 4th thermal shock. | Even 3rd thermal shock developed no crack. | No abnormality |
| 4 | No crack was formed even on exposure to 4th thermal shock. | Even 4th thermal shock produced no crack. | " |
| 5 | No crack was formed even on exposure to 4th thermal shock. | Even 4th thermal shock produced no crack. | " |
| 6 | No crack was formed even on exposure to 4th thermal shock. | 1st and 2nd thermal shocks developed no crack. | " |

Specimen No. 1 is indicated in Table 1 for a comparative purpose. Table 2 shows that Specimens Nos. 2 to 6 containing petalite had higher thermal shock resistance and acid resistance than Specimen No. 1.

EXAMPLE 2

Two plate like shaped products measuring 1000×1000×50 mm were prepared in the same manner as in Example 1 using petalite in a petalite to calcium silicate crystal ratio by weight of 5:5 (Specimen No. 2) or without using petalite (Specimen No. 1). The two specimens were baked in an electric furnace at 950° C. for 3 hours whereby the xonotlite crystal was converted into wollastonite crystal and the petalite crystal partly into β-spodumene crystal. The specimens were subjected to X-ray diffraction. The results showed that β-wollastonite crystal was found in Specimen No. 1 and that β-spodumene, petalite and β-wollastonite crystals were observed in Specimen No. 2.

The specimens were tested for the density, bending strength, thermal shock resistance and acid resistance with the results listed below in Tables 3 and 4.

TABLE 3

| Specimen No. | Petalite/calcium silicate crystal ratio (by weight) | Properties of shaped body | |
|---|---|---|---|
| | | Density (g/cm$^3$) | Bending strength (kg/cm$^2$) |
| 1 | 0/10 | 0.39 | 25 |
| 2 | 5/5 | 0.40 | 12 |

TABLE 4

| | Properties of shaped body | | |
|---|---|---|---|
| Specimen No. | Resistance to thermal shock (temp. 800° C.) | Resistance to thermal shock (temp. 1000° C.) | Acid resistance (temp. 1000° C.) |
| 1 | 1st thermal shock formed cracks and 4th thermal shock enlarged the cracks and produced more cracks. | 1st thermal shock formed cracks deep into the side portion. | Scale-like cracks developed. |
| 2 | Even 4th thermal shock developed no crack. | 2nd thermal shock sparsely developed minute cracks at the periphery of the shaped body. | No abnormality |

Specimen No. 1 is shown in Table 3 for a comparative purpose.

EXAMPLE 3

A xonotlite slurry was prepared in the same manner as in Example 1. To the slurry (45 parts, calculated as solids) were added 7 parts of amosite, 3 parts of portland cement and 45 parts of the same kind of petalite powder as used in Example 1 to obtain a slurry-A.

A slurry-B was prepared in the same manner as above with the exception of not using petalite powder.

The slurry-B prepared above in the ratio as specified below in Table 5 was placed into a mold and press-shaped. The slurry-A in the ratio as specified below in Table 5 was superposed over the layer of the slurry-B in the mold and press-shaped and the shaped body was dried at 100° C. to provide a two layer shaped product measuring 1000×1000×50 mm.

In this way, 3 specimens (Nos. 2 to 4) were prepared which were various as shown below in Table 5 in thickness of layer formed of slurry-A. Specimen No. 1 is the same as in Table 1.

The specimens were checked for the density, bending strength, thermal shock resistance and acid resistance with the results listed below in Tables 5 and 6.

TABLE 5

| Specimen No. | Slurry-A/slurry-B wt ratio (calcd. as solid) | Thickness of layer formed of slurry-A(mm) | Properties of shape body | |
|---|---|---|---|---|
| | | | Density (g/cm³) | Bending strength (kg/cm²) |
| 1 | (Slurry-B alone) | — | 0.39 | 36 |
| 2 | 1/3 | 5–5 | 0.39 | 32 |
| 3 | 1/1 | 16–17 | 0.40 | 26 |
| 4 | 3/1 | 31–32 | 0.39 | 22 |

TABLE 6

| | Properties of shaped body | | |
|---|---|---|---|
| Specimen No. | Resistance to thermal shock (temp. 500° C.) | Resistance to thermal shock (temp. 700° C.) | Acid resistance (temp. 700° C.) |
| 1 | 1st thermal shock produced cracks and 4th thermal shock enlarged the cracks. | 1st thermal shock formed cracks deep into the side portion. | Scale-like cracks developed all over the surface. |
| 2 | Even 4th thermal shock produced no crack. | No crack was formed until 4th thermal shock produced minute cracks. | No abnormality |
| 3 | Even 4th thermal shock produced no crack. | No crack was formed until 4th thermal shock produced minute cracks. | " |
| 4 | Even 4th thermal shock produced no crack. | Even 4th thermal shock produced no crack. | " |

Tables 5 and 6 reveal that the two-layer shaped products of this invention were markedly less susceptible to reduction of bending strength and had increased thermal shock resistance and acid resistance.

EXAMPLE 4

A slurry (45 parts, calculated as solids) prepared in the same manner as in Example 1 was mixed with 7 parts of amosite, 3 parts of portland cement and 45 parts of the specific inorganic compound powder as listed below in Table 7. The mixture was press-shaped and the product was dried at 100° C., giving a plate-like shaped body measuring 1000×1000×50 mm. In this way, 8 specimens were prepared (Nos. 2 to 9). Specimen No. 1 is the same as in Table 1. The specimens were tested for the density, bending strength, thermal shock resistance and acid resistance with the results shown below in Table 7.

TABLE 7

| Specimen No. | Inorganic compound | Particle size of inorganic comp. (μm) | Properties of shaped body | | | |
|---|---|---|---|---|---|---|
| | | | Density (g/cm³) | Bending strength (kg/cm²) | Resistance to thermal shock (temp. 700° C.) | Acid resistance (temp. 700° C.) |
| 1 | None | — | 0.39 | 36 | 1st thermal shock formed cracks deep into the side portion. | Scale-like cracks developed all over the surface. |
| 2 | β-Spodumene | ≦44 | 0.40 | 17 | Even 4th thermal shock produced no crack. | No abnormality |
| 3 | Quartz glass | ≦44 | 0.41 | 16 | Even 4th thermal shock produced no crack. | No abnormality |
| 4 | β-Eucryptite | ≦44 | 0.40 | 17 | Even 4th thermal shock produced no crack. | Scale-like cracks locally appeared. |
| 5 | Vycor glass | ≦44 | 0.41 | 17 | Even 4th thermal shock produced no crack. | No abnormality |
| 6 | Cordierite | ≦74 | 0.40 | 16 | Even 4th thermal shock produced no crack. | No abnormality |
| 7 | Beryl | ≦44 | 0.41 | 17 | Even 4th thermal shock produced no crack. | No abnormality |
| 8 | Aluminum titanate | ≦44 | 0.40 | 17 | Even 4th thermal shock produced no crack. | No abnormality |
| 9 | Zirconium phosphate | ≦44 | 0.40 | 16 | Even 4th thermal shock produced no crack. | No abnormality |

I claim:

1. A shaped body of calcium silicate of which the whole or the surface layer consists essentially of a mixture of calcium silicate crystal and at least one inorganic compound selected from the group consisting of spodumene, petalite, eucryptite, lithium orthoclase, quartz glass, Vycor glass, cordierite, beryl, aluminum titanate and zirconium phosphate, the weight ratio of the inorganic compound to the calcium silicate crystal being about 1:9 to about 4:1.

2. A shaped body as defined in claim 1 wherein the whole of the shaped body consists essentially of the mixture of calcium silicate crystal and at least one inorganic compound specified in claim 1.

3. A shaped body as defined in claim 1 wherein the surface layer of the shaped body consists essentially of the mixture of calcium silicate crystal and at least one inorganic compound specified in claim 1.

4. A shaped body as defined in claim 3 which has a two-layer structure comprising a layer formed of the mixture of calcium silicate crystal and at least one inorganic compound specified in claim 1 and a layer formed of the calcium silicate crystal.

5. A shaped body as defined in claim 1 wherein at least one inorganic compound is selected from the group consisting of spodumene, petalite, quartz glass, Vycor glass, cordierite, beryl, aluminum titanate and zirconium phosphate.

6. A shaped body as defined in claim 1 wherein the inorganic compound has a particle size of about 0.1 to about 1000 μm.

7. A shaped body as defined in claim 6 wherein the inorganic compound has a particle size of about 1 to 300 μm.

8. A shaped body as defined in claim 1, wherein the inorganic compound is present in an inorganic compound to calcium silicate crystal ratio by weight of about 1:4 to about 7:3.

9. A shaped body as defined in claim 8 wherein the inorganic compound is present in an inorganic compound to calcium silicate crystal ratio by weight of about 4:6 to about 6:4.

10. A shaped body as defined in claim 1 wherein the calcium silicate crystal is at least one of tobermorite crystal, xonotlite crystal and wollastonite crystal.

11. A process for preparing the shaped body of calcium silicate of claim 1 which consists essentially of the steps of mixing an aqueous slurry of calcium silicate crystal and at least one inorganic compound selected from spodumene, petalite, eucryptite, lithium orthoclase, quartz glass, Vycor glass, cordierite, beryl, aluminum titanate and zirconium phosphate in a weight ratio of the inorganic compound to the calcium silicate crystal of about 1:9 to about 4:1, and shaping the mixture and drying the shaped body.

* * * * *